Patented Sept. 29, 1936

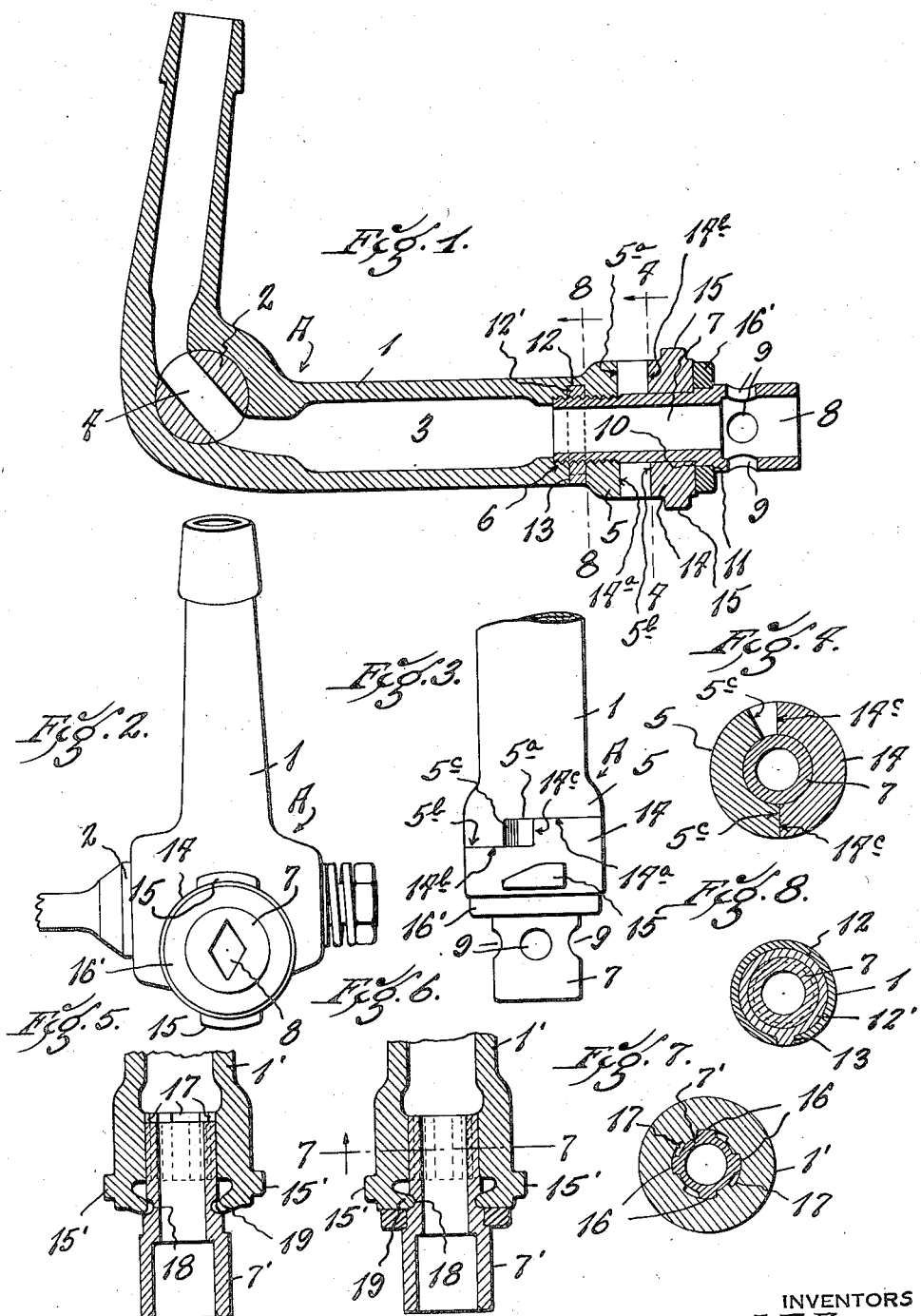

2,056,044

UNITED STATES PATENT OFFICE 2,056,044

TAPPING FITTING

Arthur J. Fausek and Irwing F. Fausek, Clayton, Mo.

Application September 27, 1934, Serial No. 745,690

11 Claims. (Cl. 285—175)

This invention relates generally to fittings, and more specifically to tapping fittings intended for use in tapping beer barrels and other containers provided with valves of the type known as lager valves, the predominant object of the invention being to provide an improved tapping fitting which is so constructed and arranged that certain parts of the tapping fitting which are introduced into the lager valves and which heretofore were in fixed relation to each other are adjustable with respect to each other, so as to permit rapid and convenient application of the fitting to a lager valve even though the stem of the lager valve is in a slightly displaced position.

As is quite generally known, beer barrels are provided with valves which are known as lager valves, there being two of such valves associated with each beer barrel, one at the opening through which pressure gas is introduced into the barrel and one at the opening through which the beer is discharged from the barrel. The type of lager valve now in general use comprises a valve housing provided at its open, outer end with L-shaped grooves, or depressed portions, which receive lugs on a fitting applied to the valve in a manner to provide a bayonet connection between the fitting and the valve. Also, a lager valve of the type described includes a valve stem provided with a closure element, and having a non-circular end portion which is engaged by a correspondingly shaped socket portion of the fitting being applied to the valve so that the valve stem may be rotated to move the closure element of the valve to an open position simultaneously with the attachment of the fitting to the valve.

The attaching lugs and the valve stem-receiving socket portion of a tapping fitting of the type heretofore used were fixed with respect to each other, hence, if a valve stem of a lager valve to which the fitting was to be applied were even slightly displaced from its proper position in a rotary direction, the fitting could not be applied to the valve until the valve stem was properly positioned. This was so because when the lugs of the fitting were alined with the entering portions of the grooves of the valve housing, the socket portion of the fitting was not properly alined with the non-circular end portion of the displaced valve stem and said socket portion could not be moved onto said non-circular end portion of said valve stem until the valve stem was properly positioned.

The difficulties and annoyances resulting from the fixed relationship of the lugs and socket portions of tapping fittings heretofore employed are eliminated in the use of the tapping fitting disclosed herein, which is so constructed and arranged that the portion of the fitting which carries the lugs and the socket portion of the fitting are arranged for slight rotary movement relative to each other. In view of this arrangement, the lugs of the improved fitting may be alined with and entered into the entering portions of the grooves of the valve housing, and when the valve stem is slightly displaced in a rotary direction the socket portion of the fitting may be rotated slightly to a position where it will pass onto the non-circular end portion of the displaced valve stem.

Fig. 1 is a longitudinal section of a tapping fitting constructed in accordance with this invention.

Fig. 2 is a front elevation of the tapping fitting shown in Fig. 1, a portion of the valve-operating means thereof being broken away.

Fig. 3 is a fragmentary plan view of the forward portion of the tapping fitting illustrated in Figs. 1 and 2.

Fig. 4 is a cross-section on line 4—4 of Fig. 1.

Fig. 5 is a fragmentary section of a modified form of the invention, showing the structure in a partially assembled condition.

Fig. 6 is a view similar to Fig. 5, but illustrating the structure in a completely assembled condition.

Fig. 7 is a cross-section on line 7—7 of Fig. 6.

Fig. 8 is a cross-section on line 8—8 of Fig. 1.

In the drawing, wherein are shown for the purpose of illustration two embodiments of the invention, A designates the improved tapping fitting generally. The fitting A includes an angular body portion 1 provided with a rotary valve 2 for controlling passage of fluid through the passageway 3 formed through the angular body portion 1, said rotary valve being provided with an opening 4 movable into and out of registration with said passageway 3. At its forward end the angular body portion 1 is provided with an enlarged portion 5 that is provided with offset forward end faces 5ª and 5ᵇ, which are joined by longitudinally extended faces 5ᶜ that are in substantially diametrically opposed relation, as shown in Fig. 4. The longitudinal faces 5ᶜ provide shoulders which serve an important function to be hereinafter referred to.

The forward end portion of the angular body portion 1 is provided with internal screw-threads 6 which receive the screw-threaded rear end portion of a tubular element 7. This tubular element, which is preferably formed of relatively hard material well adapted to withstand rough usage, extends forwardly relative to the angular body portion 1, and at the forward end of said tubular element a non-circular opening 8 is provided which serves as a socket adapted to receive a correspondingly shaped end portion of the valve stem of a lager valve. The wall portions of the tubular element 7 are provided with openings 9 formed therethrough that lead into the non-circular opening 8 of said tubular element. As shown in Fig. 1, the tubular element 7 is provided with portions of different diameters whereby annular shoulders 10 and 11 are formed on said tubular element. The angular body portion is provided with an annular depression 12 which surrounds the screw-threaded end portion of the tubular element, and an opening 13 leads into this annular depression from the outer face of the angular body portion. In order to lock the tubular element 7 to the angular body portion, lead or other suitable material 12' is poured into the annular depression 12 through the opening 13. This material fills the annular depression and hardens therein, so that the tubular element is firmly held in place.

Mounted for limited rotary movement on the tubular element 7 is a member 14, which is interposed between the annular shoulder 10 formed on the tubular element and the forward faces of the enlarged portion 5 of the angular body portion 1. The forward face of the member 14 contacts with the annular shoulder 10, and at its rear end the member 14 is provided with offset faces 14$^a$ and 14$^b$ which are joined by longitudinally extended and diametrically opposed faces 14$^c$. The offset faces 14$^a$ and 14$^b$ of the member 14 contact with the offset faces 5$^a$ and 5$^b$ of the enlarged portion 5 of the angular body portion 1, and the longitudinally extended faces 5$^c$ of said body portion 1 move toward and away from the longitudinally extended faces 14$^c$ of the member 14 when the angular body portion and the tubular element 7 are subjected to rotary movement with respect to the member 14. Formed on the member 14 at diametrically opposed points thereof is a pair of lugs 15.

Mounted on the tubular element 7 and interposed between the annular shoulder 11 and the forward face of the member 14 is a gasket 16' which provides a fluid-tight joint between the tapping fitting A and a lager valve to which the fitting is applied.

In the use of the tapping fitting illustrated in Figs. 1, 2, 3, 4, and 8, the fitting is positioned with respect to a lager valve to which it is to be applied so that the lugs 15 of the tapping fitting are alined with the entering portions of the L-shaped grooves or depressions of the lager valve which cooperate with said lugs to provide a bayonet joint between the tapping fitting and the lager valve. If the non-circular end portion of the stem of the lager valve is in its proper position, the tapping fitting may be moved inwardly relative to the lager valve, thereby causing the lugs 15 to move through the entering portion of the L-shaped grooves or depressions of the valve and the non-circular opening 8 of the tubular element to move over the non-circular end portion of the lager valve stem. The tapping fitting is then rotated, and through contact of faces 5$^c$ and 14$^c$ cause the lugs to pass longitudinally of the locking portions of the L-shaped grooves or depressions of the lager valve, so as to securely lock the tapping fitting to the lager valve. Simultaneously with such locking of the fitting to the lager valve the rotary movement of the tapping fitting rotates the valve stem of the lager valve to move the closure element of the lager valve to an open position.

Assume, however, that the valve stem of the lager valve is slightly displaced in a rotary direction from its proper position. In this event the tapping fitting is positioned with respect to the lager valve, so that the lugs are alined with the entering portions of the L-shaped grooves or depressed portions of the lager valve and the tapping fitting is moved toward the lager valve so that the lugs 15 will pass into said entering portions of said grooves or depressed portions. However, due to the displacement of the lager valve stem, the non-circular opening 8 of the tubular element 7 of the fitting will not pass onto the non-circular end portion of the valve stem as in the case where the valve stem is properly positioned. When this situation arises in the use of the improved tapping fitting disclosed herein, the tapping fitting is rotated slightly until the non-circular opening 8 registers with and moves inwardly over the non-circular end portion of the valve stem of the lager valve. During such rotary movement of the tapping fitting the member 14 is held stationary, due to the fact that the lugs 15 are in position in the entering portions of the L-shaped grooves or depressed portions of the lager valve, and the remainder of the tapping fitting, including the tubular element 7 thereof, are rotated relative to the member 14 and the lugs 15. When the non-circular opening 8 has passed over the non-circular end portion of the lager valve stem as described, rotary movement of the tapping fitting is continued to move the lugs 15 longitudinally of the locking portions of the L-shaped grooves or depressed portions of the lager valve, and to rotate the stem of the lager valve so as to move the closure element thereof to an open position, whereupon the tapping is securely fixed to the lager valve and said lager valve is in an open condition. The relative movement between the member 14 and the remainder of the tapping fitting is very slight, as the lager valve stem is never more than very slightly displaced and movement is transmitted from the tapping fitting proper to the member 14 by movement of the faces 5$^c$ of the enlarged portion 5 of the angular body portion of the fitting into contact with the corresponding faces 14$^c$ of the member 14, the faces 5$^c$ and 14$^c$ being so located and arranged that slight movement of the angular body portion 1 and the tubular element 7 relative to the member 14 is provided for.

In Figs. 5, 6, and 7 a form of the invention is illustrated where the lugs 15' are fixed with relation to the body portion 1' of the tapping fitting, and the tubular element 7' is attached to said body portion so that it is capable of rotating slightly relative to said body portion. By referring to Fig. 7 it will be noted that the splines 16 are provided at the outer face of the tubular element 7', and that these splines extend into grooves 17 formed in the inner face of the body portion of the fitting. It will also be noted that the grooves 17 are considerably wider than the splines, so that the tubular element may rotate relative to the body portion 1'.

In order to attach the tubular element 7' to the body portion 1', said tubular element is provided with an annular groove 18 and the body portion 1' is provided with an annular portion 19 which, before the tapping fitting is assembled, is positioned as shown in Fig. 5. With the annular portion 19 positioned as illustrated in Fig. 5, the tubular element 7' may be introduced into position within the forward portion of the body portion 1', the opening at the center of the annular portion 19 being sufficiently large to permit passage therethrough of the rear portion of the tubular element. After the tubular element has been properly positioned within the forward portion of the body portion 1', the annular element 19 is moved by swaging or otherwise to the position in which it is shown in Fig. 6, where the inner portion is seated in the annular groove 18 formed at the outer face of the tubular element 7'. This prevents longitudinal movement of the tubular element relative to the body portion 1', but the contact between the annular portion 19 and the tubular element is loose enough to permit rotary movement of the tubular element relative to the body portion of the fitting. By arranging the tubular element 7' so that it is capable of slight rotary movement, relative to the body portion of the fitting, said tubular element may adjust itself to slight displacements of lager valve stems.

We claim:

1. A tapping fitting adapted for attachment to lager valves comprising a body portion, lugs associated with said body portion, a socket portion provided with a non-circular opening adapted to receive a correspondingly shaped portion of a stem of a lager valve, means whereby said lugs and socket portion are arranged for rotary movement relative to each other, and means for preventing longitudinal movement of said lugs and said socket portion relative to each other.

2. A tapping fitting adapted for attachment to lager valves comprising a body portion, lugs associated with said body portion, a socket portion provided with a non-circular opening adapted to receive a correspondingly shaped portion of a stem of a lager valve, means whereby said lugs and socket portion are arranged for rotary movement relative to each other, means for limiting such relative rotary movement of said lugs and socket portion, and means for preventing longitudinal movement of said lugs and said socket portion relative to each other.

3. A tapping fitting adapted for attachment to lager valves comprising a body portion, lugs associated with said body portion, a socket portion provided with a non-circular opening adapted to receive a correspondingly shaped portion of a stem of a lager valve, means whereby said lugs and socket portion are arranged for rotary movement relative to each other, means comprising abutment faces for limiting such relative rotary movement of said lugs and socket portion, and means for preventing longitudinal movement of said lugs and said socket portion relative to each other.

4. A tapping fitting adapted for attachment to lager valves comprising a body portion, a socket portion fixed to said body portion and provided with a non-circular opening adapted to receive a correspondingly shaped portion of a stem of a lager valve, a member provided with lugs, said member and said socket portion being arranged for relative rotary movement, and means for preventing longitudinal movement of said socket portion and said member relative to each other.

5. A tapping fitting adapted for attachment to lager valves comprising a body portion, a socket portion fixed to said body portion and provided with a non-circular opening adapted to receive a correspondingly shaped portion of a stem of a lager valve, a member provided with lugs, said member and said socket portion being arranged for relative rotary movement, means for preventing longitudinal movement of said socket portion and said member relative to each other, and means for limiting relative rotary movement between said member and said socket portion.

6. A tapping fitting adapted for attachment to lager valves comprising a body portion, a socket portion fixed to said body portion and provided with a non-circular opening adapted to receive a correspondingly shaped portion of a stem of a lager valve, a member provided with lugs, said member and said socket portion being arranged for relative rotary movement, means for preventing longitudinal movement of said socket portion and said member relative to each other, and means comprising abutment faces for limiting relative rotary movement between said member and said socket portion.

7. A tapping fitting adapted for attachment to lager valves comprising a body portion, a tubular element fixed to said body portion and provided with a non-circular socket opening for receiving a correspondingly shaped portion of a stem of a lager valve, a member supported by said tubular element in a manner to provide for relative rotary movement between said tubular element and said member, lugs on said member, and means for preventing longitudinal movement of said tubular element and said member relative to each other.

8. A tapping fitting adapted for attachment to lager valves comprising a body portion, a tubular element fixed to said body portion and provided with a non-circular socket opening for receiving a correspondingly shaped portion of a stem of a lager valve, a member supported by said tubular element in a manner to provide for relative rotary movement between said tubular element and said member, means for limiting relative rotary movement between said tubular element and said member, lugs on said member, and means for preventing longitudinal movement of said tubular element and said member relative to each other.

9. A tapping fitting adapted for attachment to lager valves comprising a body portion, a tubular element fixed to said body portion and provided with a non-circular socket opening for receiving a correspondingly shaped portion of a stem of a lager valve, a member supported by said tubular element in a manner to provide for relative rotary movement between said tubular element and said member, means comprising abutment faces for limiting relative rotary movement between said tubular element and said member, lugs on said member, and means for preventing longitudinal movement of said tubular element and said member relative to each other.

10. A tapping fitting adapted for attachment to lager valves comprising a body portion, a tubular element fixed to said body portion and provided with a non-circular socket opening for receiving a correspondingly shaped portion of a stem of a lager valve, a member supported by said tubular element in a manner to provide for relative rotary movement between said tubular element and said member, means comprising abutment faces on said member and said body portion for limiting relative rotary movement between said tubular element and said member, lugs on said member, and means for preventing longitudinal movement of said tubular element and said member relative to each other.

11. A tapping fitting adapted for attachment to lager valves comprising a body portion, a tubular element fixed to said body portion and provided with a non-circular socket opening for receiving a correspondingly shaped portion of a stem of a lager valve, a member supported by said tubular element in a manner to provide for relative rotary movement between said tubular element and said member, means for limiting relative rotary movement of said tubular element and said member, lugs on said member, means for preventing longitudinal movement of said tubular element and said member relative to each other, said tubular element being formed of relatively hard material, and means for fixing said tubular element to said body portion.

ARTHUR J. FAUSEK.
IRWING F. FAUSEK.